(12) United States Patent
Matsunaga

(10) Patent No.: US 7,599,007 B2
(45) Date of Patent: Oct. 6, 2009

(54) NOISE DETECTION METHOD, NOISE REDUCTION METHOD, NOISE DETECTION DEVICE, AND NOISE REDUCTION DEVICE

(75) Inventor: Seiji Matsunaga, Kawasaki (JP)

(73) Assignee: Canon Inc., Tokyo (JP)

( * ) Notice: Subject to any disclaimer, the term of this patent is extended or adjusted under 35 U.S.C. 154(b) by 591 days.

(21) Appl. No.: 11/225,024

(22) Filed: Sep. 14, 2005

(65) Prior Publication Data

US 2006/0279661 A1    Dec. 14, 2006

(30) Foreign Application Priority Data

Jun. 9, 2005    (JP)    ............................ P2005-169248

(51) Int. Cl.
*H04N 5/14*    (2006.01)
*H04N 5/00*    (2006.01)

(52) U.S. Cl. ...................................... 348/607; 348/701

(58) Field of Classification Search ................. 348/607, 348/416, 413, 618–624, 699–701; 382/275
See application file for complete search history.

(56) References Cited

U.S. PATENT DOCUMENTS 5,208,673 A * 5/1993 Boyce .......................... 348/701
5,268,760 A * 12/1993 Suyama ....................... 348/624
6,169,583 B1 * 1/2001 Merkl et al. ................. 348/607

\* cited by examiner

*Primary Examiner*—Trang U Tran
(74) *Attorney, Agent, or Firm*—Kratz, Quintos & Hanson, LLP

(57) ABSTRACT

In detection of noise by comparing a digital input image signal and an output image signal in one previous frame with each other, when the input image signal, the output image signal in one previous frame, and a predetermined reference value are represented by a, b, and x, respectively, and when $|a-b| \leq x$ and $a-b \neq 1$ are satisfied, the presence of noise is determined.

12 Claims, 4 Drawing Sheets

NOISE DETECTING PROCESS UNIT

NOISE DETECTING PROCESS UNIT

NOISE DETECTING PROCESS UNIT

NOISE DETECTION METHOD, NOISE REDUCTION METHOD, NOISE DETECTION DEVICE, AND NOISE REDUCTION DEVICE

BACKGROUND OF THE INVENTION

1. Field of the Invention

The present invention relates to a method and device for detecting a noise component included in a digital video signal, and a noise reduction method and device.

2. Description of the Related Art

A conventional noise reduction device for reducing a noise component included in a video signal is shown in FIG. 4. In FIG. 4, reference numeral 1 denotes a video signal input unit to which a digital image signal is input; 2, a noise reducing process unit for processing pixel data d and e between adjacent sequential frames to perform a noise reducing process; and 3', a noise detecting process unit for comparing the pixel data a and b between adjacent sequential frames to perform noise detection. Reference numeral 4 denotes a selecting unit which selects and output pixel data i processed by the noise reducing process unit 2 when noise detection is performed by the noise detecting process unit 3' and which selects and directly output pixel data h input to the video signal input unit 1 when noise detection is not performed. Reference numeral 5 denotes a 1-frame delay unit constituted by a 2-port memory or the like which delays an output image signal from the selecting unit 4 by one frame, and reference numeral 6 denotes a video signal output unit.

The noise reducing process unit 2, as shown in FIG. 5, is constituted by an adder 21 for adding pixel data d of a current image signal input to the video signal input unit 1 and pixel data e, output from the 1-frame delay unit 5, of the same pixel of in one previous frame, and a divider 22 which divides output data from the adder 21 by ½. In the divider 22, when a fractional figure (less than "1") is obtained, the fractional figure is rounded down because the value is less than the LSB.

The noise detecting process unit 3', as shown in FIG. 6, a subtractor 31 which calculates a difference between pixel data a of the current video signal input to the video signal input unit 1 and pixel data b, output from the 1-frame delay unit 5, of the same pixel in one previous frame, an absolute value calculator 32 which calculates an absolute value of the difference obtained by the subtractor 31, and a comparator 33 which compares a pixel data p from the absolute value calculator 32 with a preset reference value x to output a determination signal of "noise is present" when $p \leq x$ is satisfied.

An operation of the noise reduction device will be described below with reference to FIG. 7. An upper half in FIG. 7 shows pixel data (4×4 pixels for descriptive convenience) of an input image input to the video signal input unit 1, and the lower half shows similar pixel data of an output image output from the video signal output unit 6. A case in which the reference value x in the noise detecting process unit 3' is given by x=4 on the assumption that luminance levels of the pixels are set to be levels of "0" to "255" (8 bits) will be described below.

In the noise reducing process unit 2 and the noise detecting process unit 3', pixel data of a current input image at the same pixel and pixel data of an output image in one previous frame are to be processed. For example, an input image IN2 and an output image OUT1 in one previous frame are compared with each other. The pixel data of all the pixels of the input image IN2 are "20", and pixel data of all the pixels are "19". For this reason, the noise detecting process unit 3' determines the value as "noise is present". The noise reducing process unit 2 calculates "(19+20)/2→19" (number less than 1 is rounded down). Therefore, at this time, the output from the noise reducing process unit 2 is selected by the selecting unit 4, and pixel data "19" is output as the output image OUT2.

However, in this processing method, a problem is posed when a thing traverses a certain background, for example. A case in which an image having pixel data "80" moves from the right to the left on a background having pixel data "20" like a change of input image IN4→input image IN5 will be considered.

In an output image OUT4 processed by the input image IN4 and the output image OUT3, in a pixel where pixel data "20" of the input image IN4 is compared with the pixel data "19" of the output image OUT3, the pixel data is changed into pixel data "19". In a pixel where pixel data "80" of the input image IN4 is compared with the pixel data "19" of the output image OUT3, the difference is larger than "4", noise detection is not performed, and the pixel data is kept at "80".

In an output image OUT5 processed by the input image IN5 and the output image OUT4, pixel data is changed into the pixel data "19" in a pixel where the pixel data "20" of the input image IN5 is compared with the pixel data "19" of the output image OUT4. However, since a difference between the pixel data "80" and the pixel data "19" is larger than "4" in the pixel where the pixel data "80" of the input image IN5 and the pixel data "19" of the output image OUT4 are compared with each other, noise detection is not performed, and the pixel data is kept at "80". Since a difference between the pixel data "20" and the pixel data "80" in the pixel where the pixel data "20" of the input image IN5 is compared with the pixel data "80" of the output image OUT4, noise detection is not performed, and the pixel data is kept at "20".

In an output image OUT6 processed by an input image IN6 and the output image OUT5, pixel data is changed into the pixel data "19" in a pixel where the pixel data "20" of the input image IN6 is compared with the pixel data "19" of the output image OUT5. However, since a difference between the pixel data "20" and the pixel data "80" is larger than "4" in a pixel where the pixel data "20" of the input image IN6 is compared with the pixel data "80" of the output image OUT5, the pixel data is kept at "20". Furthermore, the pixel data is kept at "20" in the pixel where the pixel data "20" of the input image IN6 is compared with the pixel data "20" of the output image OUT5.

In this manner, in the output images OUT5 and OUT6, a new boundary between the pixel data "19" and the pixel data "20" is generated and disadvantageously appears as a large noise component.

SUMMARY OF THE INVENTION

It is an object of the present invention to provide a noise reduction method and device which performs appropriate noise reduction without the inconvenience described above.

In a first aspect of the present invention, in a noise detection method for comparing an input image signal with an output image signal in one previous frame to detect noise, when the input image signal, the output image signal in one previous frame, and a predetermined reference value are represented by a, b, and x, respectively, and when $|a-b| \leq x$ and $a-b \neq 1$ are satisfied, the presence of noise is determined.

In a second aspect of the present invention, in a noise detection method for comparing an input image signal with an output image signal in one previous frame to detect noise, when the input image signal, the output image signal in one previous frame, and a predetermined reference value are represented by a, b, and x, respectively, and when $|a-b| \leq x$ and $1 < |a-b|$ are satisfied, the presence of noise is determined.

In a third aspect of the present invention, when the presence of noise is determined by applying the noise detection method according to the first or second aspect, the input image signal and the output image signal in one previous frame are input to output a signal obtained by averaging both the image signals as a noise reducing image signal, and when the presence of noise is not detected, the input image signal is directly used as an output image signal.

In a fourth aspect of the present invention, in the noise reduction method according to the third aspect to which the noise detection method according to the first aspect is applied, when the input image signal and the output image signal in one previous frame are input and averaged, a fractional figure less than "1" of an obtained value is rounded down.

In a fifth aspect of the present invention, in the noise reduction method according to the third aspect to which the noise detection method according to the second aspect is applied, when the input image signal and the output image signal in one previous frame are input and averaged, a fractional figure less than "1" of an obtained value is rounded down or rounded up.

In a sixth aspect of the present invention, in a noise detection device for comparing an input image signal with an output image signal in one previous frame to detect noise, when the input image signal, the output image signal in one previous frame, and a predetermined reference value are represented by a, b, and x, respectively, and when $|a-b| \leq x$ and $a-b \neq 1$ are satisfied, the presence of noise is determined.

In a seventh aspect of the present invention, in a noise detection device for comparing an input image signal with an output image signal in one previous frame to detect noise, when the input image signal, the output image signal in one previous frame, and a predetermined reference value are represented by a, b, and x, respectively, and when $|a-b| \leq x$ and $1 \leq |a-b|$ are satisfied, the presence of noise is determined.

In an eighth aspect of the present invention, a noise reduction device includes the noise detection device according to the sixth or seventh aspect, noise reducing process means for inputting the input image signal and the output image signal in one previous frame to obtain an average value between both the image signals, and selecting means for outputting an image signal obtained by the noise reducing process means as the output image signal when the presence of noise is detected by the noise detection device and for directly outputting the input image signal as the image output signal when the presence of noise is not detected.

In a ninth aspect of the present invention, in the noise reduction device according to the eighth aspect to which the noise detection device according to the sixth aspect is applied, the noise reducing process means receives the input image signal and the output image signal in one previous frame to round down a fractional figure less than "1" of a value obtained by averaging both the image signals.

In a tenth aspect of the present invention, in the noise reduction device according to the eighth aspect to which the noise detection device according to the seventh aspect is applied, the noise reducing process means receives the input image signal and the output image signal in one previous frame to round down or round up a fractional figure less than "1" of a value obtained by averaging both the image signals.

In the noise detection according to the first, second, sixth, or seventh aspect, when a difference between an input image signal and an output image signal in one previous frame is not 1 or less than 1, even though the difference is detected as noise in a conventional technique, noise is not detected. For this reason, when the noise detection is applied to the third to fifth aspects and the eighth to tenth aspects, appropriate noise reduction can be performed. The noise detection according to the first or sixth aspect is effective under the condition that a figure less than "1" is rounded down in the noise reducing process. The noise detection according to the second or seventh aspect is effected under both the conditions that a figure less than "1" is rounded up and rounded down in the noise reducing process.

DESCRIPTION OF THE PREFERRED EMBODIMENTS

Embodiments of the present invention will be described below. The embodiments of noise detecting process units will be described below. However, when the noise detecting process unit is incorporated in a noise reduction device, the noise detecting process unit is replaced with a noise detecting process unit 3' in a configuration in FIG. 4.

First Embodiment

Figure 1:
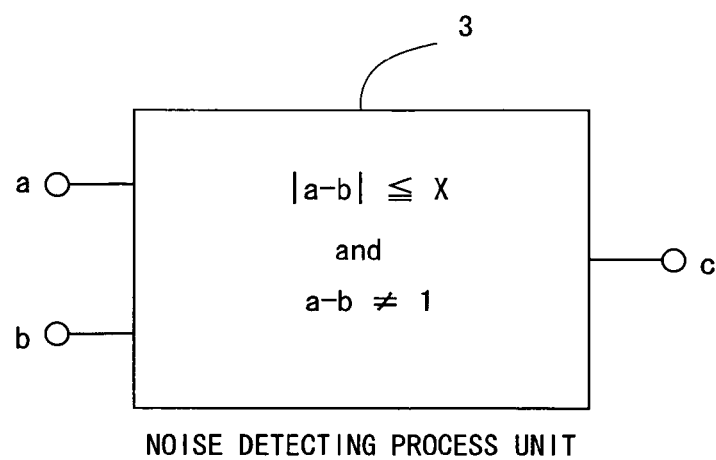
FIG. 1 is a block diagram of a noise detecting process unit according to a first embodiment of the present invention.

FIG. 1 is a diagram showing a block of a noise detecting process unit 3 according to the first embodiment. In a conventional technique, in a noise reducing process unit 2, a fractional figure (less than "1") of a value obtained by a divider 22 is rounded down. For this reason, when an absolute value $|a-b|$ of a difference between pixel data a and b is "1", the output pixel data must be smaller pixel data, and the problem described above is posed.

Therefore, in the first embodiment, when the value $|a-b|$ is "1", "absence of noise" is determined. More specifically, the noise detecting process unit 3 performs a process of outputting a signal representing "presence of noise" only when the pixel data a input from a video signal input unit 1 and the pixel data b input from a 1-frame delay unit 5 satisfy:

$|a-b| \leq x$ and $a-b \neq 1$.

Although the condition "$|a-b| \leq x$" is the same as that in the noise detecting process unit 3', the condition "$a-b \neq 1$" is additionally set in the embodiment. Therefore, for example, x="4" is set, "presence of noise" is determined only when the difference between the data a and b is "−4", "−3", "−2", "−1", "0", "2", "3", or "4". When the difference is "0", the noise reducing process unit 2 outputs pixel data equal to the pixel data a. For this reason, output pixel data of a selecting unit 4 is the same as input pixel data to the image input unit 1.

Figure 3:
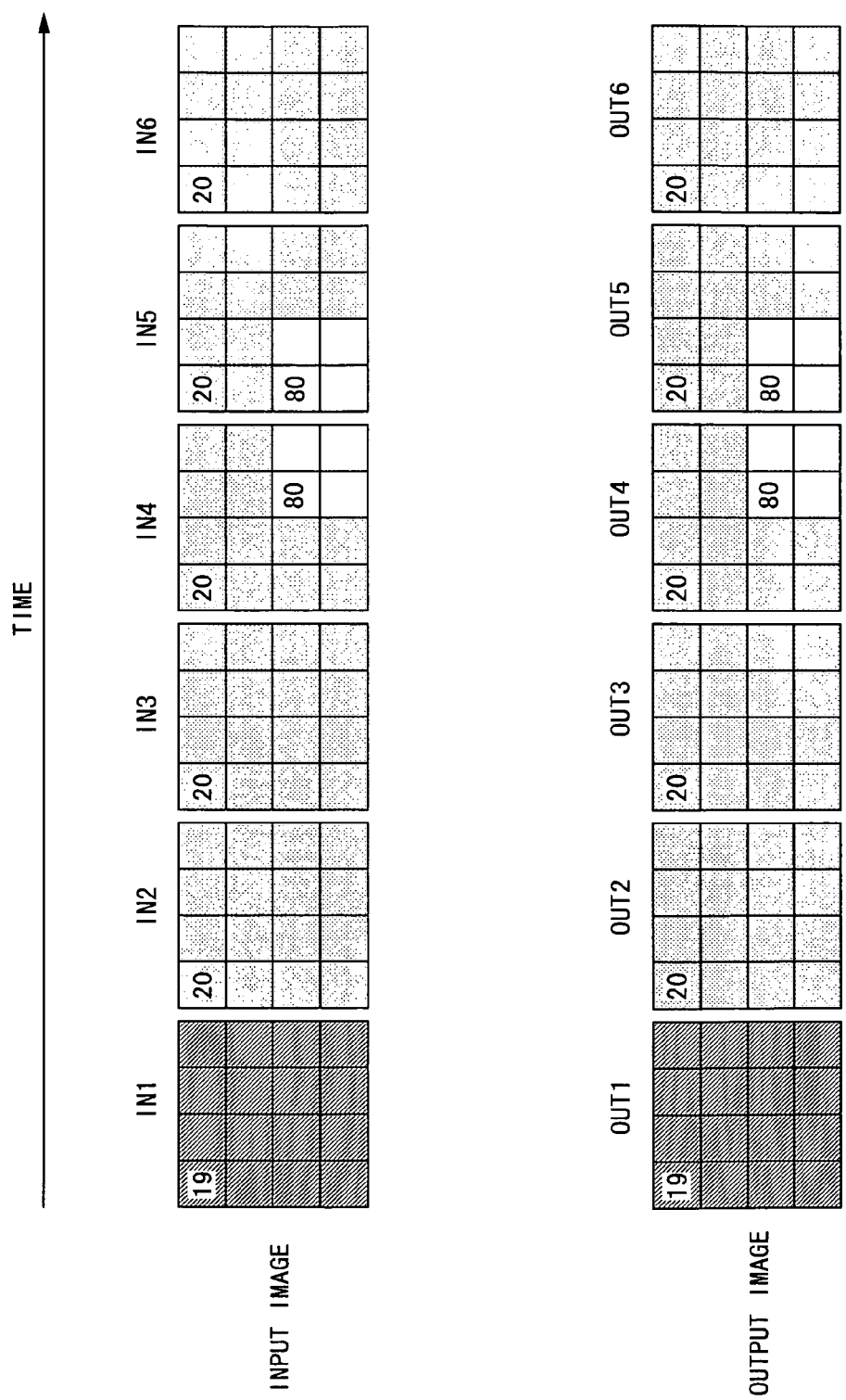
FIG. 3 is a diagram for explaining a noise reducing process performed by a noise reduction device using the noise detecting process unit in FIG. 1.
Figure 4:
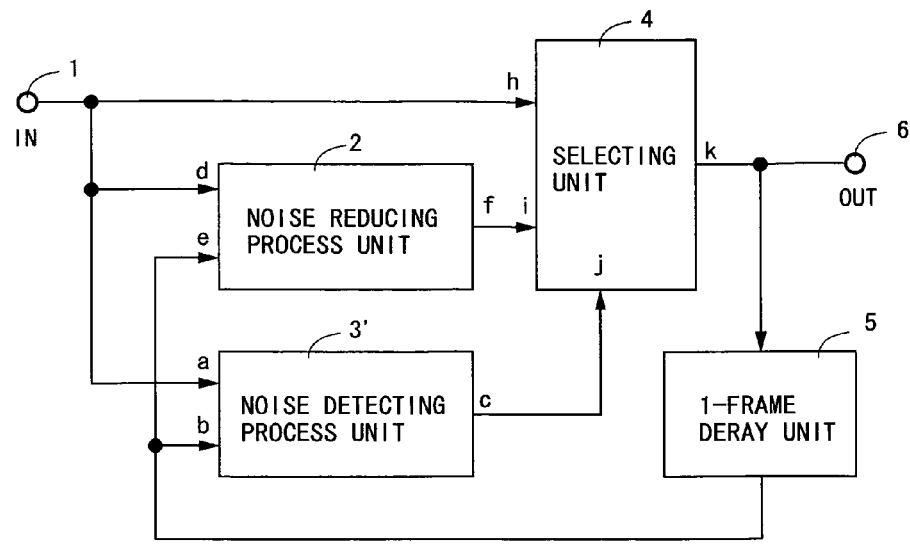
FIG. 4 is a block diagram showing the configuration of a conventional noise reduction device.
Figure 5:
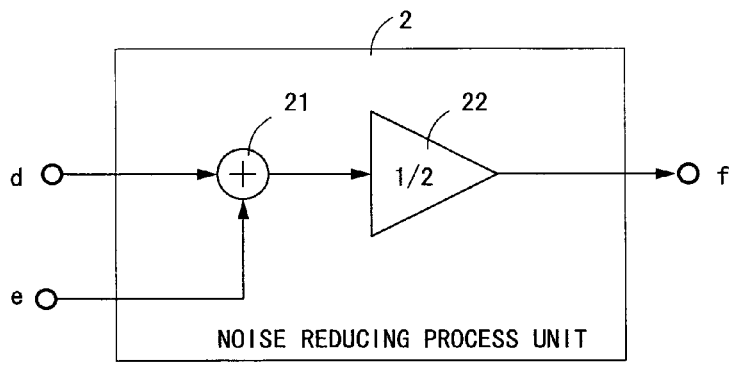
FIG. 5 is a detailed block diagram of a noise reducing process unit of the noise reduction device in FIG. 4.

FIG. 3 is a diagram for explaining a noise reducing process when the noise reduction device in FIG. 4 is constituted by using the noise detecting process unit 3. In this case, as in a change of input image IN4→input image IN5, a case in which an image having pixel data "80" moves from the right to the left on a background having pixel data "20" will be considered.

In an output image OUT2 processed by an input image IN2 and an output image OUT1, a pixel (in this case, all pixels) where the pixel data "20" of the input image IN2 and the pixel data "19" of the output image OUT1 are compared with each other has a difference of "1", noise detection is not performed, and the pixel data is kept at "20".

In an output image OUT3 processed by an input image IN3 and the output image OUT2, all pixel data of all the input image IN3 and the output image OUT2 are "20", the difference is "0", and "presence of noise" is detected. However, since output pixel data of the noise reducing process unit 2 is "20", the pixel data is kept at "20".

In an output image OUT4 processed by an input image IN4 and the output image OUT3, a pixel where pixel data "20" of the input image IN4 and the pixel "20" of the output image OUT3 are compared with each has a difference of "0", and "presence of noise" is detected. However, since output pixel data from the noise reducing process unit 2 is "20", the pixel data is kept at "20". A pixel where pixel data "80" of the input image IN4 and the pixel data "20" of the output image OUT3 are compared with each other has a difference of "60", "absence of noise" is detected, and the pixel data is kept at "80".

In an output image OUT5 processed by an input image IN5 and the output image OUT4, a pixel where pixel data "20" of the input image IN5 and the pixel data "20" of the output image OUT4 are compared with each other has a difference of "0", and "presence of noise" is detected. However, since output pixel data from the noise reducing process unit 2 is "20", the pixel data is kept at "20". A pixel where pixel data "80" of the input image IN5 and the pixel data "20" of the output image OUT4 are compared with each other has a difference of "60", "absence of noise" is detected, and the pixel data is kept at "80".

In an output image OUT6 processed by an input image IN6 and the output image OUT5, a pixel where pixel data "20" of the input image IN6 and the pixel data "20" of the output image OUT5 are compared with each other has a difference of "0", and "presence of noise" is detected. However, since output pixel data from the noise reducing process unit 2 is "20", the pixel data is kept at "20". A pixel where pixel data "20" of the input image IN6 and the pixel data "80" of the output image OUT5 are compared with each other has a difference of "60", "absence of noise" is detected, and the pixel data is kept at "20".

Figure 7:
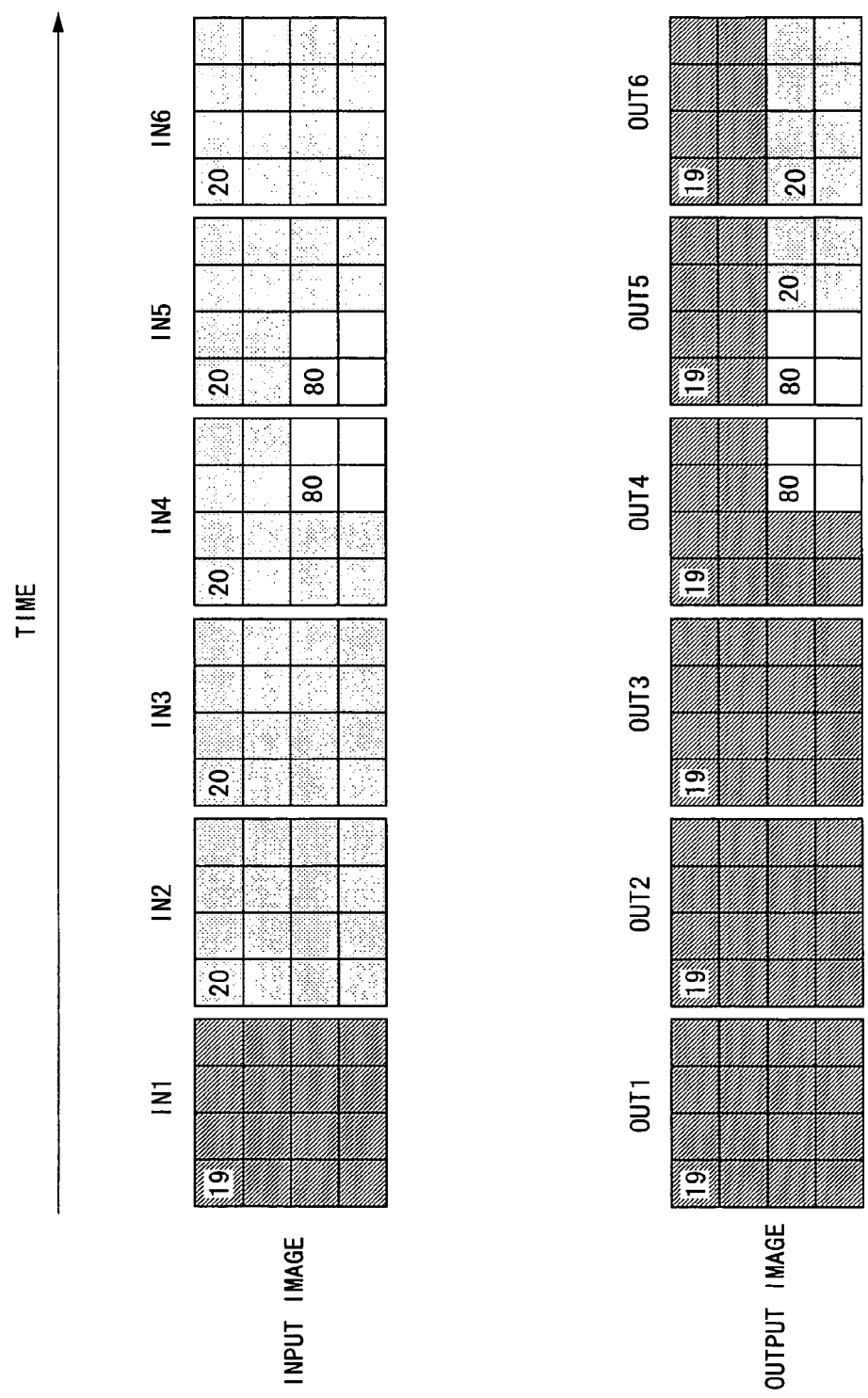
FIG. 7 is a diagram for explaining a noise reducing process performed by a noise reduction device using the noise detecting process unit in FIG. 4.

In this manner, in the output images OUT5 and OUT6, noise except for a boundary between the pixel data "20" and "80" is not generated, and the problem explained in FIG. 7 can be solved. As described above, in the noise reducing process unit 2, the problem posed in FIG. 7 when the divider 22 rounds down a fractional figure can be solved.

Second Embodiment

Figure 2:
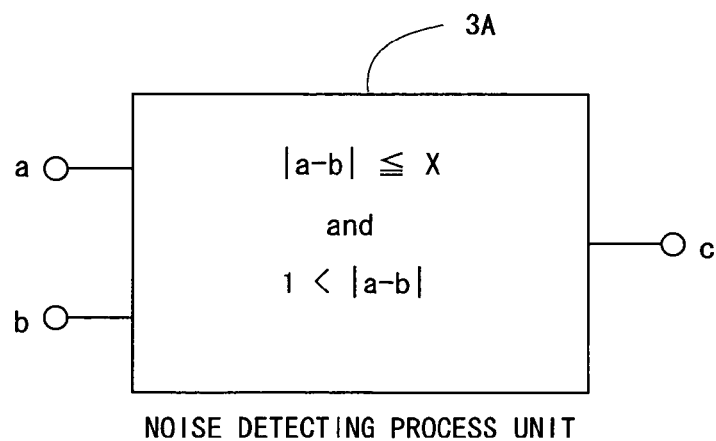
FIG. 2 is a block diagram of a noise detecting process unit according to a second embodiment of the present invention.
Figure 6:
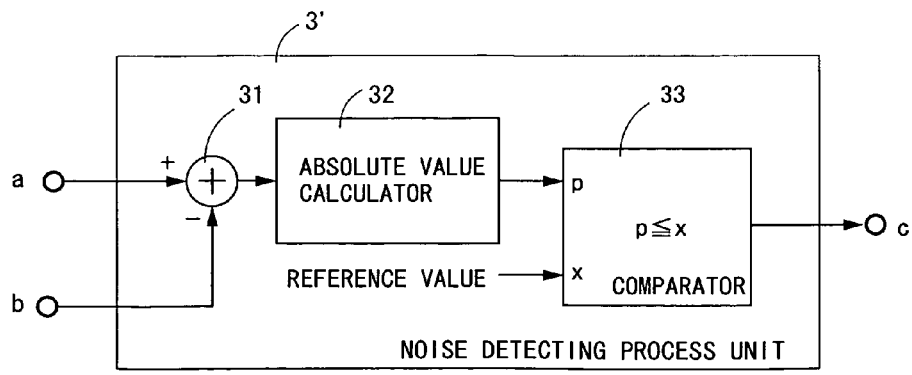
FIG. 6 is a detailed block diagram of a noise detecting process unit of the noise reduction device in FIG. 4.

FIG. 2 is a diagram showing a block of a noise detecting process unit 3A according to the second embodiment. In the second embodiment, "absence of noise" is determined when a difference between input pixels a and b, i.e., a−b is "−1", "0", or "1", "absence of noise" is determined. For this reason, even if the divider 22 rounds down or up a fractional figure of a value, the noise detecting process unit 3A can be prevented from being adversely affected by the round up or down operation. More specifically, in the noise detecting process unit 3A, when the pixel data a input from a video signal input unit 1 and the pixel data b input from a 1-frame delay unit 5 satisfy the following conditions:

$|a-b| \leq x$ and $1 < |a-b|$, a process of outputting a signal representing "presence of noise" is performed. Although the condition "$|a-b| \leq x$" is the same as that in the noise detecting process unit 3' shown in FIG. 6, the condition "a−b≠1" is additionally set in the embodiment. Therefore, for example, x="4" is set, "presence of noise" is determined only when the difference between the data a and b is "−4", "−3", "−2", "2", "3", or "4".

Third Embodiment

In the first and second embodiments, when an image signal to be input is a signal of an interlace system, a 2-field signal is digitally processed into a 1-frame signal in advance, and the resultant pixel data is input to the image signal input unit 1 of the noise reduction device according to the embodiment. When the image signal to be input is an RGB signal, noise reducing processes are performed in red, green, and blue, respectively.

What is claimed is:

1. A noise detection method for comparing a digital input image signal with an output image signal in one previous frame to detect noise, comprising
   inputting a digital image signal of sequential frames into a noise detecting process unit for comparing pixel data, and
   outputting a digital image signal of sequential frames from the noise detecting process unit for comparing pixel data, wherein
   when pixel data of the input image signal, pixel data of the output image signal in one previous frame, and a predetermined reference value are represented by a, b, and x, respectively, and when $|a-b| \leq x$ and a−b≠1 are satisfied, the presence of noise is determined.

2. A noise reduction method wherein when the presence of noise is determined by applying the noise detection method according to claim 1, the input image signal and the output image signal in one previous frame are input to output a signal obtained by averaging pixel data of both the image signals as a noise reducing image signal, and when the presence of noise is not detected, the input image signal is directly used as an output image signal.

3. The noise reduction method according to claim 2, wherein when the input image signal and the output image signal in one previous frame are input and the pixel data is averaged, a fractional figure less than "1" of an obtained value is rounded down.

4. A noise detection method for comparing a digital input image signal with an output image signal in one previous frame to detect noise, comprising
   inputting a digital image signal of sequential frames into a noise detecting process unit for comparing pixel data, and
   outputting a digital image signal of sequential frames from the noise detecting process unit for comparing pixel data, wherein
   when pixel data of the input image signal, pixel data of the output image signal in one previous frame, and a predetermined reference value are represented by a, b, and x, respectively, and when $|a-b| \leq x$ and $1 < |a-b|$ are satisfied, the presence of noise is determined.

5. A noise reduction method of claim 4, wherein when the presence of noise is determined, the input image signal and the output image signal in one previous frame are input to output a signal obtained by averaging both pixel data of the image signals as a noise reducing image signal, and when the presence of noise is not detected, the input image signal is directly used as an output image signal.

6. The noise reduction method according to claim 5, wherein
when the input image signal and the output image signal in one previous frame are input and the pixel data is averaged, a fractional figure less than "1" of an obtained value is rounded down or rounded up.

7. A noise detection device far comparing a digital input image signal with an output image signal in one previous frame to detect noise, comprising
a noise detecting process unit for inputting a digital image signal of sequential frames for comparing pixel data and for outputting the digital image signal of sequential frames, wherein
when pixel data of the input image signal, pixel data of the output image signal in one previous frame, and a predetermined reference value are represented by a, b, and x, respectively, and when $|a-b| \leqq x$ and $a-b \neq 1$ are satisfied, the presence of noise is determined.

8. The noise reduction device of claim 7, further comprising: a noise reducing process means unit for inputting the output image signal and the output image signal in one previous frame to obtain an average value of pixel data between both the image signals; and a selecting means unit for outputting an image signal obtained by the noise reducing process means unit as the output image signal when the presence of noise is detected by the noise detecting process and for directly outputting the input image signal as the image output signal when the presence of noise is not detected.

9. The noise reduction device according to claim 8, wherein
the noise reducing process unit receives the input image signal and the output image signal in one previous frame to round down a fractional figure less than "1" of a value obtained by averaging both pixel data of the image signals.

10. A noise detection device for comparing an input image signal with an output image signal in one previous frame to detect noise, comprising
a noise detecting process unit for inputting a digital image signal of sequential frames for comparing pixel data and for outputting the digital image signal of sequential frames, wherein
when pixel data of the input image signal, pixel data of the output image signal in one previous frame, and a predetermined reference value are represented by a, b, and x, respectively, and when $|a-b| \leqq x$ and $1 < |a-b|$ are satisfied, the presence of noise is determined.

11. The noise reduction device of claim 10, further comprising: a noise reducing process unit for inputting the output image signal and the output image signal in one previous frame to obtain an average value of pixel data between both the image signals; and a selecting unit for outputting an image signal obtained by the noise reducing process unit as the output image signal when the presence of noise is detected by the noise detecting process unit and for directly outputting the input image signal as the image output signal when the presence of noise is not detected.

12. The noise reduction device according to claim 11, wherein
the noise reducing process unit receives the input image signal and the output image signal in one previous frame to round down or round up a fractional figure less than "1" of a value obtained by averaging both pixel data of the image signals.

* * * * *